(12) United States Patent
Mijolovic et al.

(10) Patent No.: US 8,324,419 B2
(45) Date of Patent: Dec. 4, 2012

(54) PROCESS FOR PREPARING POLYETHER CARBONATE POLYOLS

(75) Inventors: Darijo Mijolovic, Mannheim (DE);
Markus Kummeter, Heddesheim (DE);
Michael Stoesser, Neuhofen (DE);
Stephan Bauer, Ostercappeln (DE);
Stephan Goettke, Heidelberg (DE)

(73) Assignee: BASF SE, Ludwigshafen (DE)

( * ) Notice: Subject to any disclaimer, the term of this patent is extended or adjusted under 35 U.S.C. 154(b) by 661 days.

(21) Appl. No.: 12/524,005

(22) PCT Filed: Jan. 21, 2008

(86) PCT No.: PCT/EP2008/050646
§ 371 (c)(1),
(2), (4) Date: Jul. 22, 2009

(87) PCT Pub. No.: WO2008/092767
PCT Pub. Date: Aug. 7, 2008

(65) Prior Publication Data
US 2010/0048935 A1 Feb. 25, 2010

(30) Foreign Application Priority Data
Jan. 30, 2007 (EP) .................................. 07101407

(51) Int. Cl.
*C08G 64/34* (2006.01)
*C08G 65/26* (2006.01)
(52) U.S. Cl. ........................................ 558/276; 558/277
(58) Field of Classification Search .................. None
See application file for complete search history.

(56) References Cited

U.S. PATENT DOCUMENTS

| | | | |
|---|---|---|---|
| 4,500,704 A | 2/1985 | Kruper et al. | |
| 5,689,012 A | 11/1997 | Pazos et al. | |
| 5,777,177 A | 7/1998 | Pazos | |
| 5,919,988 A | 7/1999 | Pazos et al. | |
| 6,713,599 B1 * | 3/2004 | Hinz et al. | 528/408 |
| 6,762,278 B2 | 7/2004 | Hinz et al. | |
| 2003/0143910 A1 | 7/2003 | Mashburn et al. | |
| 2003/0191274 A1 | 10/2003 | Kurth et al. | |
| 2006/0223973 A1 | 10/2006 | Hinz et al. | |

FOREIGN PATENT DOCUMENTS

| | | |
|---|---|---|
| DE | 27 11 002 | 9/1978 |
| EP | 0 222 453 | 5/1987 |
| EP | 0879259 | 11/1998 |
| EP | 1 359 177 | 11/2003 |
| WO | 2004 020497 | 3/2004 |
| WO | 2004 087788 | 10/2004 |
| WO | 2004 096882 | 11/2004 |
| WO | 2004 096883 | 11/2004 |
| WO | 2008 013731 | 1/2008 |

OTHER PUBLICATIONS

U.S. Appl. No. 12/681,788, filed Apr. 6, 2010, Voelkel, et al.

* cited by examiner

*Primary Examiner* — Michael Barker
(74) *Attorney, Agent, or Firm* — Oblon, Spivak, McClelland, Maier & Neustadt, L.L.P.

(57) ABSTRACT

The invention relates to a process for preparing polyether carbonate polyols by addition of alkylene oxides and carbon dioxide onto H-functional starter substances using DMC catalysts, wherein one or more starter substances are initially placed in the reactor and one or more starter substances are metered continuously into the reactor during the reaction.

27 Claims, No Drawings

PROCESS FOR PREPARING POLYETHER CARBONATE POLYOLS

The present invention relates to a process for preparing polyether carbonate polyols by addition of alkylene oxides and carbon dioxide onto H-functional starter substances using DMC catalysts. Polyether carbonate polyols can be used as polyols for producing polyurethanes for, for example, foams, elastomers, sealants, coatings and adhesives. Furthermore, polyether carbonate polyols can be used in the known applications of polyols based on alkylene oxides, e.g. laundry detergent formulations and cleaner formulations, drilling fluids, fuel additives, ionic and nonionic surfactants, lubricants, process chemicals for paper or textile production or cosmetic formulations. The process described here allows the use of low molecular weight starter substances for the polymerization, reduces the formation of undesirable by-products and makes high proportions of incorporated carbon dioxide into polyether carbonate polyols possible.

The preparation of polyether carbonate polyols by addition of alkylene oxides and carbon dioxide onto H-functional starter substances using double metal cyanide catalysts, also referred to as DMC catalysts, and the use of these polyols, for example for producing polyurethanes, is known.

In general, the market is demanding advantageous alternatives to conventional polyols for polyurethane systems. A person skilled in the art will know that polyether polyols are mostly used as polyol components for, for example, the production of flexible polyurethane foams. Polyether polyols are, as is known, prepared by addition of alkylene oxides onto H-functional starter substances. The most frequently used alkylene oxides are ethylene oxide and propylene oxide. From a commercial point of view, the use of carbon dioxide as comonomer in alkylene oxide polymerizations is of particular interest. Partial replacement of alkylene oxides in polyols by carbon dioxide has the potential of significantly reducing the costs of the preparation of polyols.

Although the use of carbon dioxide as comonomer in the polymerization of alkylene oxides has been known since the end of the 1960s (Inou et al., Copolymerization of Carbon Dioxide and Epoxide with Organometallic Compounds, Die Makromolekulare Chemie 130, 210-220, 1969), the disadvantages of the process as known hitherto stand in the way of a wide market.

To be able to prepare polyether carbonate polyols which can compete in terms of economics and use with existing polyols, energy-intensive and costly processes which require high pressures, high temperatures and long reaction times have to be avoided.

A person skilled in the art will know that, depending on the respective field of application, for example in polyurethane systems, polyols to be used have to have required materials properties such as molecular weights, viscosities, polydispersities and functionalities.

Furthermore, when process chemicals such as solvents, catalysts or cocatalysts are used, the costs of these and especially the expense of separating them off from the product after the preparation have to be taken into account. The removal of secondary components can be necessary firstly to avoid problems in the subsequent reactions with, for example, polyisocyanates and secondly to adhere to the required specifications of the end products. Specifications required can be, for example, in respect of contents of volatile components, metals, bases or acids.

It is known that by-products are formed by reaction of alkylene oxides with carbon dioxide during the synthesis of polyether carbonate polyols. Thus, for example, propylene carbonate is obtained as by-product in the reaction of propylene oxide and carbon dioxide. The formation of propylene carbonate is undesirable for a number of reasons: propylene carbonate consumes the expensive monomer propylene oxide; propylene carbonate can interfere considerably in the subsequent reaction of polyether carbonate polyols with polyisocyanates and therefore has to be separated off from the product mixture; propylene carbonate is a volatile component and has to be removed down to the appropriate specification limits in order to conform to emission limit values, for example of flexible polyurethane foams. An economical process for preparing polyether carbonate polyols therefore requires a reduction in and, if possible, avoidance of by-products.

U.S. Pat. No. 4,500,704 describes a process for preparing exclusively bifunctional polycarbonates (synonym for the polyether carbonate polyols described here) using DMC catalysts. Since no H-functional starter substances are used but only alkylene oxides and carbon dioxide are reacted, functionalities of >2 cannot be achieved by the process described. Furthermore, the process requires pressures of from 27.6 to 75.8 bar, since otherwise the yields are very low. The reaction times of at least 48 hours are uneconomical.

WO 2004/087788 describes the preparation of polyether carbonate polyols using multi metal cyanide catalysts with addition of chain transfer agents, for example tert-butanol to reduce the polydispersity. Here, 10-fold, preferably 50-fold and very particularly preferably more than 100-fold, molar excesses, based on the catalyst, are used. The lowest polydispersity described was 1.31. Since the chain transfer agents mentioned are exclusively low molecular weight compounds and, as described, these do not participate in the reaction of carbon dioxide or alkylene oxides, they have to be separated off in a further process step after the preparation of the polyether carbonate polyols. The process described is a high-pressure process. The examples of the preparation of polyether carbonate polyols were carried out in the range from 57.9 to 62.1 bar.

U.S. Pat. No. 6,762,278 describes a process for the copolymerization of alkylene oxides and carbon dioxide using multimetal cyanide catalysts, with preference being given to Zn/Co catalysts which are crystalline and comprise at least 30% by weight of platelet-like particles. The polyether carbonate polyols are prepared in the temperature range 40-180° C. using not more than 1% by weight of catalyst. The process described requires pressures of 0.7-206.8 bar. It is stated that the degree of incorporation of carbonate units into the polyether carbonate polyols depends greatly on the pressure. In the examples, it is conspicuous that in this process pressures of at least >34.5 bar (500 psi) are necessary to achieve a content of >5% by weight of carbonate units in polyether carbonate polyols. If a pressure of 13.8 bar (200 psi) is selected, as in Example 5, the carbonate content of the polymer decreases significantly to 2.6% by weight. It can be concluded from this that, in the process described, costly high-pressure apparatuses would be necessary for an industrial preparation of polyether carbonate polyols if carbonate contents of >5% by weight were sought. Quantitative information about the formation of the by-product propylene carbonate and also the reaction times is not given.

EP 222,453 describes a process for preparing polycarbonates (synonym for the polyether carbonate polyols described here) by reaction of carbon dioxide and alkylene oxides in the presence of double metal cyanide catalysts, one or more salt(s) of at least divalent metal cations and nonmetallic anions and/or one or more acids which comprise(s) no metal ions. Preference is given to Zn/Co double metal cyanide catalysts.

The total amount of catalyst and cocatalyst is 0.01-15% by weight, based on the amounts of starter substance used. The preparation of the polycarbonates is carried out in the temperature range 40-200° C. The process described has the advantage of mild reaction conditions in respect of pressure and temperature which make it possible to use standard reactors for polyether polyol syntheses. The process has the disadvantage of the very high amounts of propylene carbonate formed. Examples 1 to 9 give, depending on the reactor pressure set, propylene carbonate contents of from 12.8% by weight (Example 1) to 30.7% by weight (Example 3). The lowest content of propylene carbonate of Example 1 is associated with a low degree of incorporation of carbon dioxide of 4.8 mol %. The large amounts of propylene carbonate formed in the process described make it uneconomical for the abovementioned reasons of the consumption of propylene oxide and the separation required.

It was therefore an object of the present invention to develop a process for preparing polyether carbonate polyols which is economically competitive with conventional polyols, especially polyether polyols. The process should be carried out in a simple way and with a low outlay in terms of apparatus and energy-intensive and costly process steps such as high pressures, high temperatures and long reaction times should be avoided. The polyether carbonate polyols should have good properties in respect of viscosity, polydispersity, molecular weight and the opportunity of introducing variably adjustable functionalities corresponding to their field of use. The use of solvents should be avoided and the content of DMC catalyst should be kept as small as possible. At the same time, the content of incorporated carbon dioxide in the form of carbonate units should be high and the formation of by-product(s) from the reaction of alkylene oxide(s) with carbon dioxide should be as low as possible.

It has surprisingly been found that polyether carbonate polyols meeting the abovementioned requirements can be prepared by polyaddition of alkylene oxides and carbon dioxide onto H-functional starter substances having a functionality of at least 1 using DMC catalysts, in which one or more starter substances are initially placed in the reactor and one or more starter substances are metered continuously into the reactor during the reaction.

The invention accordingly provides a process for preparing polyether carbonate polyols by polyaddition of alkylene oxides and carbon dioxide onto H-functional starter substances having a functionality of at least 1 using DMC catalysts, wherein one or more starter substances are initially placed in the reactor and one or more starter substances are metered continuously into the reactor during the reaction.

The invention further provides the polyether carbonate polyols prepared by the process of the invention.

The amount of one or more starter substances which are metered continuously into the reactor during the reaction is at least 5 mol %, preferably at least 20 mol % and very preferably at least 40 mol %, of the total amount of starter substance.

In a preferred embodiment of the process of the invention, the concentration of free alkylene oxides in the reaction mixture during the reaction is >0-40% by weight, preferably >0-25% by weight, particularly preferably >0-15% by weight and in particular >0-10% by weight, based on the weight of the reaction mixture.

In a further preferred embodiment of the process of the invention, the chain ends of the polyether carbonate polyols have a block of an average of at least two, preferably an average of three, preferably an average of more than three, alkylene oxide units.

For the purposes of the present invention, the term "reaction mixture" refers to the mixture of starting materials and reaction products present in the reactor.

The concentration of free alkylene oxides in the reaction mixture can be measured, for example, by means of an ATR-FTIR probe, a density measurement, GC, GC/MS, HPLC or other direct or indirect methods. For the purposes of the present invention, the concentration of free alkylene oxides in the reaction mixture is usually measured by means of an ATR-FTIR probe.

A person skilled in the art will understand that the amounts of alkylene oxides and of carbon dioxide to be used are calculated using appropriate data for the starter substances and the polyether carbonate polyol. If, for example, a polyfunctional alcohol is used as starter substance, its hydroxyl number and the desired hydroxyl number of the polyether carbonate polyol to be synthesized therewith serves as a basis for the calculation of the amounts of alkylene oxides and of carbon dioxide. If amines are used as starter substances, then the amine numbers serve as basis, while in the case of acids the corresponding acid numbers serve as basis. To determine a hydroxyl, amine or acid number, it is necessary to know the functionality of the substance measured. Furthermore, it is adequately known that the functionality of the starter substance used or the mixture of a plurality of starter substances determines the functionality of the polyol prepared from this by means of alkoxylation. The same applies here to the polyether carbonate polyols of the invention. Accordingly, a trifunctional starter substance such as glycerol produces a trifunctional polyether carbonate polyol.

In the process of the invention, one or more starter substances are metered in continuously and will hereinafter be referred to as $S_C$. In addition, one or more starter substances are initially placed in the reactor and will hereinafter be referred to as $S_R$. $S_C$ and $S_R$ together give the total amount of starter $S_T = S_C + S_R$. $S_C$ and $S_R$ can be identical materials. $S_C$ and $S_R$ are preferably different and particular preference is given to $S_C$ and $S_R$ being different but having the same functionality and very particular preference is given to $S_C$ and $S_R$ being different and having the same functionality and $S_R$ being prepared by alkoxylation of $S_C$. An example of the particularly preferred structures of $S_C$ and $S_R$ is glycerol as $S_C$ and propoxylated glycerol as $S_R$. It can be seen from what has been said above that the molar amount and functionality of $S_T$ is the same as the molar amount of the polyether carbonate polyol to be synthesized. The molar amounts of $S_C$ and $S_R$ are derived from $S_T$, where $S_T$ is in each case 100 mol %. The respective proportions of $S_C$ and $S_R$ are chosen as a function of the process. The amount of $S_C$ is at least 5 mol %, preferably at least 20 mol % and very preferably at least 40 mol %, of $S_T$.

The content of incorporated carbon dioxide in the form of carbonate units, based on the part of the molecule built up during the reaction without the starter substance(s), is preferably 2-25% by weight, more preferably 3-20% by weight and particularly preferably 5-15% by weight, in the process of the invention.

The total reactor pressure in the process of the invention is preferably in the range 0-30 bar, more preferably 1-15 bar and very particularly preferably 3-10 bar, and the reaction temperature is in the range 60-150° C., more preferably 70-140° C. and particularly preferably 80-130° C.

A person skilled in the art will know that, in the synthesis of polyetherols, the total amount of a starter substance or a mixture of a plurality of starter substances are initially placed in the reactor together with the appropriate catalyst in batch or semibatch processes and one or more appropriate alkylene oxides are metered in. Furthermore, it is known that DMC catalysts have a very poor reaction behavior or display no reaction with low molecular weight starter substances such as water, propylene glycol, glycerol, trimethylolpropane, diethylene glycol and others. Since low molecular weight starter substances have an inhibiting action, polyetherols or other relatively high molecular weight H-functional starter substances are used in, in particular, batch or semibatch processes in which the total amount of starter substance is initially placed in the reactor. A disadvantage of this process is that the relatively high molecular weight starter substances, usually polyether polyols, firstly have to be synthesized in a separate step.

EP 879,259 describes a process in which this problem can be overcome. Continuous metered addition of a partial amount of at least 2 mol % or optionally the total amount of starter substance enables low molecular weight starter substances to be used for the synthesis of polyether polyols without broad molecular weight distributions resulting. The remaining part of starter substance is initially placed in the reactor together with the DMC catalyst. The starter substance which is initially placed in the reactor preferably has the same functionality as the low molecular weight starter substance to be metered in. The difference is that the initially charged starter substance has to be alkoxylated to a certain degree for it not to have an inhibiting effect on the DMC catalyst. In the process described, it is even possible for the initial charge to be product from a previous synthesis ("heel" process).

It is also known to those skilled in the art that carbon dioxide reduces the reactivity of DMC catalysts. Thus, all the above-described processes have longer reaction times than polymerizations of alkylene oxides without the presence of carbon dioxide when DMC catalysts are used. At the same time, low molecular weight starter substances likewise have, as described above, an inhibiting effect on DMC catalysts, especially in batch and semibatch processes. For this reason, all previously known processes which use H-functional starter substances for the synthesis of polyether carbonate polyols (synonym: polycarbonates) employ relatively high molecular weight starter substances based on polyether polyol. The simultaneous presence of the inhibiting effects of the carbon dioxide comonomer and of the low molecular weight starter substances has hitherto been prohibitive for the preparation of polyether carbonate polyols. Thus, the examples in WO 2004/087788 and U.S. Pat. No. 6,762,278 use exclusively a glycerol-based polypropylene oxide having a mean molecular weight of $M_w$=730 g/mol as starter substance. The total amount of this polyether polyol is initially placed in the reactor before the reaction in all examples. Additional introduction of further starter substances into the reaction mixture during the reaction does not occur. US 222,453 uses a glycerol-based polypropylene oxide having a mean molecular weight of $M_w$=300 g/mol (CARADOL 555-1) as starter substance in all the examples described. Likewise, the total amount required for the synthesis of the polyether carbonate polyols is initially placed in the reactor before the metered addition of alkylene oxides and carbon dioxide.

It has surprisingly been found that, in the synthesis of polyether carbonate polyols, it is not necessary for the total amount of starter substance $S_T$ which is necessary for the synthesis of the respective polyether carbonate polyol having the appropriate molecular weight to be initially placed in the reactor, but it is instead possible for one or more starter substances to be metered in continuously ($S_C$) and one or more starter substances to be initially placed in the reactor ($S_R$). It is found in the process described here that the reaction proceeds well despite metered addition of low molecular weight starter substances. It was also surprising that, compared to earlier processes in which the total amount of starter substance $S_T$ is initially placed in the reactor, higher proportions of incorporated carbon dioxide into polyether carbonate polyols can be achieved by means of the process described here and at the same time the formation of by-products from the reaction of alkylene oxides and carbon dioxide can be reduced.

The other advantages which are mentioned in EP 879,259 and are obtained in the case of continuous addition of one or more starter substances (here $S_C$), for example efficient utilization of the reactor, use of low molecular weight starter substances, narrow molecular weight distributions, etc., may be referred to here. The process variant described in EP 879,259 in which no starter substances are initially placed in the reactor and instead solvents such as toluene are used is not preferred for the process of the invention. Use of solvents would require separation of these from the product, which was to be avoided according to the object of the invention.

Polyether carbonate polyols according to the present invention have, as a result of addition of alkylene oxides and carbon dioxide onto H-functional starter substances having a functionality of at least 1 using DMC catalysts, a content of incorporated carbon dioxide in the form of carbonate units, based on the part of the molecule built up by the reaction without the starter substance(s), of at least 2-25% by weight, preferably 3-20% by weight and particularly preferably 5-15% by weight.

The content of incorporated carbon dioxide is based on the part of the molecule of the respective polyether carbonate polyol which is built up by the reaction without the starter substance(s).

The polyether carbonate polyols are prepared, as described, by catalytic addition of alkylene oxides and carbon dioxide onto H-functional starter substances. To carry out the reaction, the starter substance or a mixture of at least two starter substances is initially placed in the reactor and, if necessary, water and/or other volatile compounds are removed. The amount initially charged here is, as described, not the total amount of starter substance $S_T$ but only $S_R$. $S_R$ is preferably a starter substance or a mixture of at least two starter substances having a molecular weight of at least $M_n$=200 g/mol and a functionality of at least 1. In particular, $S_R$ is a starter substance or a mixture of at least two starter substances having a molecular weight of at least $M_n$=300 g/mol and a functionality of at least 1.

The removal of water and/or other volatile compounds is effected, for example, by stripping with nitrogen under reduced pressure or by distillation under reduced pressure at temperatures of 50-200° C., preferably 80-160° C., particularly preferably 100-130° C. In the process of the invention described here, distillation under reduced pressure at temperatures of 100-130° C. is preferred. This pretreatment of $S_R$ composed of a starter substance or the mixture of at least two starter substances will hereinafter be referred to as drying in the interest of simplicity.

The catalyst can be initially charged together with $S_R$, but it is also possible for the catalyst to be added only after drying of $S_R$. The catalyst can be added in solid form or as a concentrated suspension in a starter substance. The catalyst is preferably added as a suspension in a starter substance, particularly preferably in the same starter substance or starter substance mixture as the previously charged $S_R$. If the catalyst is added as a suspension, this is preferably added before the drying of $S_R$. Typical concentrations of the DMC catalyst in the catalyst suspension are 2-50% by weight, preferably 2-25% by weight and particularly preferably 2-10% by weight, based on the catalyst suspension.

Before the metered addition of one or more alkylene oxides, the carbon dioxide and $S_C$, the reactor can be made inert by means of a protective gas such as nitrogen or be evacuated. The reactor is preferably made inert by repeated, alternate application of vacuum and subsequent flushing with nitrogen before the metered addition of one or more alkylene oxides, the carbon dioxide and $S_C$ in order to avoid undesirable reactions of one or more alkylene oxides with oxygen.

The metered addition of one or more alkylene oxides, carbon dioxide and $S_C$ is carried out after the optional drying of $S_R$ and the addition of the multimetal cyanide catalyst which is added as solid or in the form of a suspension before or after drying. The metered addition of one or more alkylene oxides, the carbon dioxide and $S_C$ can in principle be carried out in various ways. The metered addition can be commenced starting from the vacuum or at a previously selected initial pressure. The initial pressure is preferably set by introduction of an inert gas such as nitrogen, with the pressure preferably being set to 10 mbar-5 bar, preferably 100 mbar-3 bar and particularly preferably 500 mbar-2 bar.

The metered addition of one or more alkylene oxides, the carbon dioxide and $S_C$ can be carried out simultaneously or sequentially, with the total amount of carbon dioxide being able to be added all at once or be metered in over the reaction time. The carbon dioxide is preferably metered in. The metered addition of one or more alkylene oxides is carried out simultaneously with or after the metered addition of carbon dioxide. If a plurality of alkylene oxides are used for the synthesis of the polyether carbonate polyols, they can be introduced simultaneously or sequentially via separate feed streams or via one or more feed streams, with at least two alkylene oxides being metered in as a mixture. Random, alternating, block-like or gradated polyether carbonate polyols can be synthesized according to the way in which the alkylene oxides and the carbon dioxide are introduced. The metered addition of $S_C$ can be carried out simultaneously with or after the metered additions of one or more alkylene oxides and the metered addition of carbon dioxide. If $S_C$ is a single starter substance, this can be fed into the reactor via a single, separate feed stream or as a mixture with one or more alkylene oxides. If $S_C$ is a single starter substance, it is preferably metered in separately. If $S_C$ comprises more than one starter substance, these can be metered in as individual substances or as a mixture or as a mixture with one or more alkylene oxides. If $S_C$ comprises more than one starter substance, these are preferably not metered in as a mixture with alkylene oxides but instead are particularly preferably fed into the reactor as a mixture of all starter substances via one feed stream. As described, it is advantageous in the process of the invention, regardless of the way in which the metered additions are carried out, that the total concentration of free alkylene oxides during the entire addition time is 0-40% by weight, particularly preferably 0-25% by weight, in particular 0-15% by weight and very particularly preferably 0-10% by weight, based on the mass of the liquid phase.

The amount of carbon dioxide to be used for the synthesis of the polyether carbonate polyols is calculated from the above-described data for the starter substances used, the hydroxyl number of the product and the desired proportion of incorporated carbon dioxide in the polyether carbonate polyol. The amount of carbon dioxide used can deviate from the calculated amount. Preference is given to using an excess of carbon dioxide; in particular, the amount of carbon dioxide is determined via the total pressure under the reaction conditions. Due to the sluggish reaction of carbon dioxide compared to DMC-catalyzed alkoxylations, an excess of carbon dioxide is advantageous. It has also been found in the process of the invention that a reaction at 60-150° C., preferably 70-140° C., particularly preferably 80-130° C., and pressures of 0-20 bar, preferably 1-15 bar and particularly preferably 3-10 bar, produces desired polyether carbonate polyols. If temperatures below 60° C. are set, the reaction stops. At temperatures above 150° C., the amount of undesirable by-products increases greatly.

In a particular embodiment of the invention, the reaction temperature and the total reactor pressure are varied during the reaction.

After $S_R$ together with the multimetal cyanide catalyst have been dried and made inert, one or more alkylene oxides, carbon dioxide and $S_C$ can be metered in either from the vacuum or at a set initial pressure, preferably from the vacuum. The addition of carbon dioxide can be carried out before, after or simultaneously with the addition of alkylene oxide and $S_C$. Here, a calculated amount of carbon dioxide, an excess over the calculated amount of carbon dioxide or the amount of carbon dioxide which results in a particular reactor pressure can be added. The metered addition of the carbon dioxide is preferably carried out after commencement of the metered addition of one or more alkylene oxides and $S_C$.

In a particular embodiment of the invention, part of the total amount of one or more alkylene oxides is initially added to $S_R$ and the catalyst in order to activate the system. Only then are carbon dioxide and $S_C$ introduced into the reaction mixture. The partial amount of the alkylene oxides can be 0.1-20%, preferably 0.5-10% and particularly preferably 1-5%, based on the total amount of alkylene oxides to be introduced.

In a further particular and preferred embodiment of the invention, part of the total amount of one or more alkylene oxides is added to $S_R$ and the catalyst in order to activate the system. The partial amount can be 0.1-20%, preferably 0.5-10% and particularly preferably 1-5%, based on the total amount of the alkylene oxides to be introduced. A partial amount of $S_C$ of 0.1-20%, preferably 0.5-10% and particularly preferably 1-5%, of the total amount of $S_C$ to be introduced is then firstly metered in continuously. During the metered addition of the partial amount of $S_C$, the metered addition of one or more alkylene oxides is preferably not stopped. Only after the partial amount of $S_C$ has been metered in is carbon dioxide added to the reaction mixture. During this, the metered additions of $S_C$ and one or more alkylene oxides are preferably not stopped.

If more than one alkylene oxide is used for the synthesis of the polyether carbonate polyols, the alkylene oxides can be introduced either separately or as mixtures. A person skilled in the art will see that separate additions are necessary to form block-like structures. Random structures can be achieved by separate metered additions of individual alkylene oxides or by introduction of mixtures of alkylene oxides.

Furthermore, combinations of different structure types in one polyether carbonate polyol can be influenced by the way in which the alkylene oxides are introduced, either as separate metered additions or as metered addition of mixtures, and the time sequence of the additions. Furthermore, it is possible in the synthesis of polyether carbonate polyols to control the incorporation of carbon dioxide according to when and at what reactor pressure carbon dioxide is present in the system. For example, it is possible to temporarily stop all metered additions during a reaction, allow the amounts of alkylene oxides and carbon dioxide present in the reactor to react completely or remove them by application of reduced pressure and then continue using only an alkylene oxide, a plurality of alkylene oxides or mixtures of a plurality of alkylene oxides without feeding in further carbon dioxide. Preference is given to all of the partial amount of $S_C$ having been introduced, one or more metered additions of one or more alkylene oxides having been stopped beforehand and the amounts of free alkylene oxide present in the reactor being <0.5% by weight before carbon dioxide and residual alkylene oxide(s) are removed by application of reduced pressure.

For example, a polypropylene oxide having $M_n$=600 g/mol which has firstly been reacted with propylene oxide and carbon dioxide in the presence of a catalyst can be used as $S_R$. After a particular amount of propylene oxide, carbon dioxide and the total amount of monopropylene glycol ($S_C$) to be introduced has been metered in, the introduction of carbon dioxide and of propylene oxide is stopped, the system is monitored to determine the amount of free propylene oxide and when the free propylene oxide is <0.5% is briefly evacuated and subsequently only propylene oxide is introduced. This gives a polyether carbonate polyol which in the middle part of the molecule comprises a pure polypropylene oxide block, then comprises a chain made up of randomly distributed propylene oxide and carbonate units on both sides of the molecule and has further pure propylene oxide units as end blocks.

In a preferred embodiment of the invention, the polyether carbonate polyols have a block comprising an average of at least two, preferably an average of three, preferably an average of more than three, alkylene oxide units at the chain ends. In this embodiment, the formation of by-products from the reaction of carbon dioxide and alkylene oxide(s) is surprisingly suppressed strongly. In particular, the blocks at the end of the chain comprise propylene oxide units.

$S_R$ is preferably dried together with the catalyst, made inert and the reactor is then evacuated. A partial amount of one or more alkylene oxides is then introduced to activate the system. The partial amount can be 0.1-20%, preferably 0.5-10% and particularly preferably 1-5%, of the total amount of alkylene oxides to be introduced. The partial amount introduced for the activation can either consist of only one alkylene oxide, a plurality of separately introduced alkylene oxides or a mixture of at least two alkylene oxides. The partial amount preferably consists of one alkylene oxide or a mixture of at least two alkylene oxides, particularly preferably one alkylene oxide and in particular propylene oxide. The activation of the system can be recognized by an exothermic reaction and/or a pressure drop in the reactor. It is in principle possible to introduce one or more alkylene oxides and carbon dioxide in the activation of the catalyst. However, the activation of the catalyst is preferably carried out using pure alkylene oxide, in particular propylene oxide, since carbon dioxide is known to reduce the reactivity of the DMC catalyst and propylene oxide is more active than other alkylene oxides toward DMC catalysts.

The activation of the catalyst is preferably followed firstly by the continuous metered addition of a partial amount of $S_C$, with the partial amount being 0.1-20%, preferably 0.5-10% and particularly preferably 1-5%, of the total amount of $S_C$ to be metered in. The metered addition of one or more alkylene oxides is preferably not stopped during the introduction of the partial amount of $S_C$.

Only after the partial amount of $S_C$ has been metered in is carbon dioxide fed into the reaction mixture. The metered additions of $S_C$ and one or more alkylene oxides is preferably not stopped during this. The total amount of carbon dioxide to be used can be added all at once or in a regulated fashion via a set flow rate. In a further embodiment, the carbon dioxide is metered in at a set pressure via a regulating valve. If the reactor pressure drops below a set pressure, carbon dioxide is introduced until the set pressure has been restored. The total amount of carbon dioxide used is preferably greater than the amount calculated from the desired proportion of incorporated carbon dioxide in the polyester carbonate polyol. Carbon dioxide is preferably metered in via a set flow rate or a set pressure, particularly preferably via a set pressure. A person skilled in the art will know that, depending on the reactor volume, the fill height of the reactor, the properties of the liquid phase, the composition of the gas phase and further parameters, a particular amount of carbon dioxide is present in the reactor at a preset pressure and a set temperature. This means that the amounts of carbon dioxide available at a constant pressure and constant temperature during the reaction are nevertheless different since the other parameters change during the reaction.

In the case of the preferred process, it has been found, as described, that desired polyether carbonate polyols can be produced at 60-150° C., preferably 70-140° C., particularly preferably 80-130° C., and pressures of 0-20 bar, preferably 1-15 bar, and particularly preferably 3-10 bar. Both the temperature and the pressure can remain constant or vary within the indicated limits during the reaction. It is possible to realize temperature and/or pressure profiles with temperature and/or pressure being reduced or increased either stepwise or continuously during the reaction. It is likewise possible for one or more metered additions of one or more alkylene oxide(s) and carbon dioxide to be varied during the reaction, with feed streams being switched on, switched off or feed rates being increased or reduced.

This is of particular importance since it has surprisingly been found that the polyether carbonate polyols prepared by the process of the invention having a particularly low content of by-products can be synthesized by paying attention to the content of free alkylene oxides during the reaction. Advantageous concentration ranges of the free alkylene oxides have been found to be, based on the mass of the liquid phase, 0-40% by weight, particularly preferably 0-25% by weight, in particular 0-15% by weight and very particularly preferably 0-10% by weight. This means that it has to be ensured that the abovementioned upper limits of free alkylene oxides are not exceeded during the synthesis. It has surprisingly been found that free alkylene oxide concentrations which are too high produce higher proportions of undesirable by-products. This can mean that feed streams of one or more alkylene oxide(s) have to be temporarily reduced or completely shut off or the reactor temperature has to be increased during the addition time in order to avoid further accumulation of alkylene oxide(s).

Regulation of the addition of carbon dioxide during the reaction results in the reaction being controlled better and the reaction not coming to a halt. Here, a larger amount of carbon dioxide results in a higher pressure and a slower reaction, while smaller amounts of carbon dioxide result in a low pressure and a more rapid reaction.

It goes without saying that the metered addition of $S_C$ can likewise be varied by switching on or switching off the feed stream(s) or increasing or decreasing the feed rate(s).

Furthermore, it is clear that in batch and semibatch processes the metered addition(s) of the total amount of $S_C$ has to be complete before the end of the metered addition(s) of one or more alkylene oxides, since otherwise unreacted $S_C$ remains in the product and has to be separated off. The total amount of $S_C$ has to have been introduced into the reactor before preferably 99% and particularly preferably 95% of the total amount of one or more alkylene oxides has been introduced.

After the preparation of the polyether carbonate polyols by the process of the invention, a work-up is carried out in a customary manner. Such a work-up can comprise a distillation for removing unreacted monomers and volatile by-products or, if necessary, a filtration. It is possible to leave the catalyst in the end product. For some applications, it can also be necessary to remove it, for example by filtration. Antioxidants are usually added to the end product.

Since the process described here makes it possible to introduce starter substances continuously and thus achieve high proportions of incorporated carbon dioxide in polyether carbonate polyols and at the same time reduce the formation of by-products, the process can also be employed for continuous preparation of polyether carbonate polyols.

A further preferred embodiment of the process of the invention therefore comprises a continuous preparation of the polyether carbonate polyols. Here, the DMC catalyst and one or more starter substances are initially placed in the reactor in a first step, with the starter substances used preferably having a molecular weight $M_n$ of at least 200 g/mol and particularly preferably at least 300 g/mol and a functionality of at least 1. The starter substances are very particularly preferably polyether carbonate polyols which correspond to the product and have been prepared in a separate process.

The mixture of DMC catalyst and one or more starter substances is then activated by means of one or more alkylene oxides, preferably propylene oxide. After the activation, one or more alkylene oxide(s), carbon dioxide and starter substances are metered in continuously. The starter substances are preferably low molecular weight compounds having a functionality of at least 1 and a molecular weight $M_n$ of <300 g/mol, but it is in principle also possible to use starter substances having a molecular weight $M_n$ of >300 g/mol. To realize a continuous process, the end product is taken continuously from the reactor. Since DMC catalyst is taken from the reactor together with the end product, more of this has to be fed into the reactor in the required amount.

Such a process has been described for the preparation of polyether polyols by means of DMC catalysts in, for example, WO 98/03571.

Suitable starter substances for the process of the invention include all compounds having H atoms which are active in an alkoxylation reaction. Alkoxylation-active groups having active H atoms are —OH, —NH, —SH and $CO_2H$, preferably —OH and —NH, in particular —OH.

As starter substances $S_R$, preference is given to using relatively high molecular weight compounds having a molecular weight of at least $M_n$=200 g/mol and particularly preferably at least $M_n$=300 g/mol and a functionality of at least 1. As starter substances $S_C$, preference is given to using low molecular weight compounds having a molecular weight of less than $M_n$=300 g/mol and particularly preferably less than $M_n$=200 g/mol and a functionality of at least 1. Furthermore, $S_C$ and $S_R$ are preferably different, and particular preference is given to $S_C$ and $S_R$ being different but having the same functionality and very particular preference is given to $S_C$ and $S_R$ being different and having the same functionality and $S_R$ being prepared by alkoxylation of $S_C$.

As suitable starter substances, it is possible to use, for example, water, monofunctional and polyfunctional alcohols, monofunctional and polyfunctional amines, monofunctional and polyfunctional thiols, monofunctional and polyfunctional amino alcohols, monofunctional and polyfunctional thioalcohols, polyether polyols, polyester polyols, polyester ether polyols, polycarbonate polyols, polyethylenimines, hyperbranched polyglycerols, hyperbranched polycarbonate polyols, hyperbranched polyester polyols, hyperbranched polyurethane polyols, PolyTHF®, polyetheramines (Jeffamine® from Huntsman Int. LLC, Polyetheramine® D230, D400, D200, T403, T5000 from BASF AG), polytetrahydrofuran amines (Polytetrahydrofuranamin® 1700 from BASF AG), polyether thiols and polyacrylatols. In a preferred embodiment, castor oil, the monoglyceride or diglyceride of ricinoleic acid or monoglycerides of fatty acids can be used as starter substances. Furthermore, it is possible to use chemically modified monoglycerides, diglycerides, triglycerides of fatty acids or $C_1$-$C_{24}$-alkyl esters of fatty acids in which an average of at least 2 OH groups per molecule have been introduced chemically. The chemical modifications for introducing OH groups into fats, oils and derivatives thereof are known to those skilled in the art. Examples of chemical modifications for introducing OH groups on monoglycerides, diglycerides, triglycerides or $C_1$-$C_{24}$-alkyl esters of fatty acids are ring opening of epoxidized fat and oil derivatives, as are described, for example, in DE 2711002, or hydroformylation of fat and oil derivatives, as are described in WO 2004096882 or WO 2004096883, or other modifications as are described in WO 2004020497, US 2003143910 or US 2003191274. Mention may be made by way of example of commercial products such as Lupranol Balance® (from BASF AG), Merginol® grades (from Hobum Oleochemicals GmbH), Sovermol® grades (from Cognis Deutschland GmbH & Co. KG), Soyol™ grades (from USSC Co.) and BiOH™ grades (from Cargill Inc.). It is possible for all the compounds mentioned to be used as starter substances, either as individual substances or as mixtures of at least 2 of the compounds mentioned.

Monofunctional and polyfunctional alcohols suitable as starter substances are, for example: monofunctional alcohols such as methanol, ethanol, 1- and 2-propanol, 1- and 2-butanol, linear or branched $C_3$-$C_{20}$-monoalcohols in general, bifunctional alcohols such as ethylene glycol, diethylene glycol, propylene glycol, dipropylene glycol, 1,3-propanediol, 1,4-butanediol, 1,5-pentanediol 1,6-hexanediol, linear or branched $C_3$-$C_{20}$ diols in general; trifunctional alcohols: trimethylolpropane, glycerol, castor oil; tetrafunctional alcohols: pentaerythritol; polyalcohols: sorbitol, hexitol, sucrose, starch, starch hydrolyzates, cellulose, cellulose hydrolyzates, hydroxyl-functionalized fats and oils. Starter substances used for the preparation according to the invention of polyether carbonate polyols are in particular alcohols having functionalities of 1-8, either as the individual substance or as a mixture of at least 2 of the alcohols mentioned. Preference is given to using bifunctional and/or trifunctional alcohols as starter substances.

Monofunctional or polyfunctional amines suitable as starter substances are, for example: ammonia, methylamine, ethylamine, propylamine, isopropylamine, dimethylamine, diethylamine, morpholine, piperazine, straight-chain or branched $C_3$-$C_{18}$ monoamines and diamines in general, ethylenediamine, triethylenetetramine, tetraethylenepentaamine, propylenediamine, polyethylenimines having $M_w$=300-5000 g/mol, isomers of toluenediamine, polyetheramines or isomers of diaminodiphenylmethane. Preference is given to ethylenediamine and isomers of toluenediamine.

The starter substances can also be selected from the class of polyether polyols, in particular those having a molecular weight $M_n$ in the range from 106 to 10 000 g/mol. Polyether polyols used are at least 1-functional, preferably from 1- to 8-functional, particularly preferably from 1- to 3-functional, polyether polyols. These can be random copolymers, gradated copolymers, alternating or block copolymers of ethylene oxide and propylene oxide. Suitable polyether polyols made up of recurring propylene oxide and/or ethylene oxide units are, for example, the Lupranol® grades from BASF AG. Further suitable homopolyethylene oxides are, for example, the Pluriol® E or AE grades or Lutensol® grades from BASF AG, suitable homopolypropylene oxides are, for example, the Pluriol® P grades from BASF AG, suitable mixed copolymers of ethylene oxide and propylene oxide are, for example, the Pluronic® PE or Pluriol® RPE grades from BASF AG.

The starter substances can also be selected from the class of polyester polyols, in particular those having a molecular weight $M_n$ in the range from 200 to 10 000 g/mol. Polyester polyols having a functionality of at least 2 are used. Polyester polyols preferably comprise alternating acid and alcohol units. As acid components, preference is given to using succinic acid, adipic acid, phthalic anhydride, phthalic acid or mixtures of the acids and/or anhydrides mentioned. As alcohol components, preference is given to using glycol, 1,2-propanediol, 1,3-propanediol, 1-4-butanediol, 1,5-pentanediol, 1,6-hexanediol, diethylene glycol, dipropylene glycol or mixtures of the alcohols mentioned. If bifunctional or polyfunctional polyether polyols are used as alcohol component, the polyester ether polyols obtained can likewise serve as starter substances for preparing the polyether carbonate polyols. Preference is given to using polyether polyols having $M_n$=150-2000 g/mol for preparing the polyester ether polyols.

Further starter substances which can be used are polycarbonate diols, in particular those having a molecular weight $M_n$ in the range from 150 to 10 000 g/mol, which are prepared, for example, by reacting phosgene, dimethyl carbonate, diethyl carbonate or diphenyl carbonate with 2-functional alcohols or polyester polyols or polyether polyols. Examples of polycarbonates may be found, for example, in the patent application EP 1359177. For example, the Desmophen® C grades from Bayer AG can be used as polycarbonate diols.

In a further embodiment of the invention, polyether carbonate polyols can be used as starter substances. In particular, polyether carbonate polyols prepared by the process of the invention are used. Continuous processes for preparing polyether carbonate polyols are particularly preferably carried out using polyether carbonate polyols which correspond in terms of molecular weight and functionality to the product. These polyether carbonate polyols used as starter substances $S_C$ and/or $S_R$, preferably $S_R$, are prepared beforehand in a separate reaction step.

In a further embodiment, unsaturated monohydroxy and polyhydroxy compounds, for example vinyl alcohol, allyl alcohol, propargyl alcohol, vinyl ether alcohols, allyl ether alcohols, monohydroxyacrylates and alkoxylated variants of the unsaturated monohydroxy and polyhydroxy compounds mentioned, are used as starter substances. The following compounds may be mentioned by way of example: vinyl alcohol, allyl alcohol, hydroxyethyl acrylate, hydroxyethyl methacrylate, hydroxypropyl acrylate, hydroxybutyl acrylate, 2-butene-1,4-diol, 4-hydroxybutyl vinyl ether.

Preferred H-functional starter substances are water, methanol, $C_{10}$-$C_{20}$-n-alkyl monoalcohols, glycol, propanediol, diethylene glycol, dipropylene glycol, glycerol, trimethylolpropane, pentaerythritol, castor oil, sorbitol, polyether polyols made up of recurring polyalkylene oxide units and polyether carbonate polyols. Particular preference is given to water, glycol, propanediol, diethylene glycol, dipropylene glycol, glycerol, trimethylolpropane, 1- to 4-functional polyether polyols made up of propylene oxide or of propylene oxide and ethylene oxide and polyether carbonate polyols. The polyether polyols preferably have a molecular weight $M_n$ in the range from 106 to 10 000 g/mol and a functionality of from 1 to 4 and in particular a molecular weight $M_n$ in the range from 106 to 5000 g/mol and a functionality of from 1 to 3. In continuous processes for preparing polyether carbonate polyols, polyether carbonate polyols which correspond in terms of molecular weight and functionality to the product are particularly preferably used. These polyether carbonate polyols used as starter substances $S_C$ and/or $S_R$, preferably $S_R$, are prepared beforehand in a separate reaction step. The preferred starter substances are used either as the individual substance or as a mixture of at least 2 of the substances mentioned.

Furthermore, starter substances $S_R$ used are preferably relatively high molecular weight compounds having a molecular weight of at least $M_n$=200 g/mol and particularly preferably at least $M_n$=300 g/mol and a functionality of at least 1. Particular preference is given here to polyether polyols, castor oil and polyether carbonate polyols. In particular, these polyether polyols and polyether carbonate polyols have a molecular weight $M_n$ in the range from 300 to 10 000 g/mol and a functionality of from 1 to 4 and especially a molecular weight $M_n$ in the range from 300 to 5000 g/mol and a functionality of from 1 to 3.

As starter substances $S_C$, preference is given to using low molecular weight compounds having a molecular weight of less than $M_n$=300 g/mol and particularly preferably less than $M_n$=200 g/mol and a functionality of at least 1. Particular mention may be made here of water, methanol, $C_{10}$-$C_{20}$-n-alkyl monoalcohols, glycol, propanediol, diethylene glycol, dipropylene glycol, glycerol, trimethylolpropane, pentaerythritol, castor oil and sorbitol. Particular preference is given to water, glycol, propanediol, diethylene glycol, dipropylene glycol, glycerol, trimethylolpropane and castor oil.

Furthermore, $S_C$ and $S_R$ are preferably different in terms of their constitution, and particular preference is given to $S_C$ and $S_R$ being different but having the same functionality and very particular preference is given to $S_C$ and $S_R$ being different and having the same functionality and $S_R$ being prepared by alkoxylation of $S_C$.

As alkylene oxides, it is possible to use pure alkylene oxides, mixtures of alkylene oxides or mixtures of oxides of industrially available raffinate streams. In general, alkylene oxides having 2-24 carbon atoms can be used in the process of the invention. The following compounds may be mentioned by way of example: ethylene oxide, propylene oxide, 1-butene oxide, 2,3-butene oxide, 2-methyl-1,2-propene oxide (isobutene oxide), 1-pentene oxide, 2,3-pentene oxide, 2-methyl-1,2-butene oxide, 3-methyl-1,2-butene oxide, 1-hexene oxide, 2,3-hexene oxide, 3,4-hexene oxide, 2-methyl-1,2-pentene oxide, 4-methyl-1,2-pentene oxide, 2-ethyl-1,2-butene oxide, 1-heptene oxide, 1-octene oxide, 1-nonene oxide, 1-decene oxide, 1-undecene oxide, 1-dodecene oxide, 4-methyl-1,2-pentene oxide, butadiene monoxide, isoprene monoxide, cyclopentene oxide, cyclohexene oxide, cycloheptene oxide, cyclooctene oxide, styrene oxide, methylstyrene oxide. In a particular embodiment of the invention, monoepoxidized or polyepoxidized fats and oils as monoglycerides, diglycerides and triglycerides or epoxidized fatty acids or their $C_1$-$C_{24}$ esters can be used as alkylene oxides. In a further particular embodiment, epichlorohydrin, glycidol or derivatives of glycidol, for example methyl glycidyl ether, ethyl glycidyl ether; allyl glycidyl ether, can be used as alkylene oxides. In particular, ethylene oxide and/or propylene oxide, especially propylene oxide, are used as alkylene oxides for preparing polyether carbonate polyols according to the invention.

The multimetal cyanide catalysts used for preparing the polyether carbonate polyols preferably have the general formula (IV)

$$M^1{}_a[M^2(CN)_b(A)_c]_d \cdot fM^1gX_n \cdot h(H2O) \cdot eL \quad (IV)$$

where
$M^1$ is a metal ion selected from the group consisting of $Zn^{2+}$, $Fe^{2+}$, $Co^{3+}$, $Ni^{2+}$, $Mn^{2+}$, $Co^{2+}$, $Sn^{2+}$, $Pb^{2+}$, $Mo^{4+}$, $Mo^{6+}$, $Al^{3+}$, $V^{4+}$, $V^{5+}$, $Sr^{2+}$, $W^{4+}$, $W^{6+}$, $Cr^{2+}$, $Cr^{3+}$, $Cd^{2+}$, $M^2$ is a metal ion selected from the group consisting of $Fe^{2+}$, $Fe^{3+}$, $Co^{2+}$, $Co^{3+}$, $Mn^{2+}$, $Mn^{3+}$, $V^{4+}$, $V^{5+}$, $Cr^{2+}$, $Cr^{3+}$, $Rh^{3+}$, $Ru^{2+}$, $Ir^{3+}$ and $M^1$ and $M^2$ are identical or different, A is an anion selected from the group consisting of halide, hydroxide, sulfate, carbonate, cyanide, thiocyanate, isocyanate, cyanate, carboxylate, oxalate and nitrate, X is an anion selected from the group consisting of halide, hydroxide, sulfate, carbonate, cyanide, thiocyanate, isocyanate, cyanate, carboxylate, oxalate and nitrate, L is a water-miscible ligand selected from the group consisting of alcohols, aldehydes, ketones, ethers, polyethers, esters, ureas, amides, nitriles and sulfides, and a, b, c, d, g and n are selected so that the compound is electrically neutral and e is the coordination number of the ligand, f is a fraction or integer greater than or equal to 0 and h is a fraction or integer greater than or equal to 0.

These compounds are prepared by generally known methods by combining the aqueous solution of a water-soluble metal salt with the aqueous solution of a hexacyanometalate compound, in particular a salt or an acid, and adding a water-soluble ligand during or after the combination of the solutions. To produce the polyether carbonate polyol of the invention, preference is given to using multimetal cyanide catalysts for which the hexacyanometalate compound used was the corresponding acid.

The polyether carbonate polyols prepared by the process of the invention have, depending on the starter substances $S_C$ and $S_R$ used, a functionality of at least 1, preferably from 1 to 8, particularly preferably from 1 to 4 and in particular from 1 to 3.

As starter substances $S_C$, preference is given to using low molecular weight compounds having a molecular weight of less than $M_n$=300 g/mol and particularly preferably less than $M_n$=200 g/mol and a functionality of at least 1. Furthermore, $S_C$ and $S_R$ are preferably different in terms of their constitution, and particular preference is given to $S_C$ and $S_R$ being different but having the same functionality and very particular preference is given to $S_C$ and $S_R$ being different and having the same functionality and $S_R$ being prepared by alkoxylation of $S_C$.

The polyether carbonate polyols prepared by the process of the invention preferably have a structure which can be described by the general formula (I):

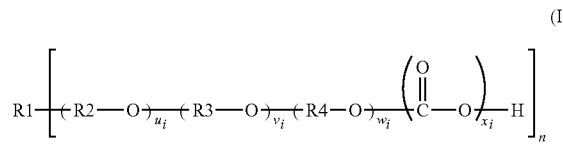

(I)

where
R1 is a starter substance radical without the H atoms which are active in the alkoxylation, for example molecule radicals of water, monofunctional and polyfunctional alcohols, monofunctional and polyfunctional amines, monofunctional and polyfunctional thiols, monofunctional and polyfunctional amino alcohols, monofunctional and polyfunctional thioalcohols, polyetherols, polyesterols, polyester etherols, polycarbonate diols, polyethylenimines, hyperbranched polyglycerols, hyperbranched polycarbonate polyols, hyperbranched polyester polyols, hyperbranched polyurethane polyols, PolyTHF®, polyetheramines, polytetrahydrofuran amines, polyether thiols, polyacrylatols, unsaturated monohydroxy and polyhydroxy compounds, polyether carbonate polyols; also the molecule radical of castor oil, monoglycerides or diglycerides of castor oil, monoglycerides or diglycerides of fatty acids, monoglycerides, diglycerides, triglycerides or $C_1$-$C_{24}$-alkyl esters of fatty acids having at least one hydroxyl group, whose hydroxyl group(s) has/have been introduced beforehand by chemical modification known to those skilled in the art, R2 is $CH_2$—$CH_2$, R3 is $CH_2$—$CH(CH_3)$, R4 is $CH_2$—$CH(R5)$, $CH(R6)$-$CH(R6)$, $CH_2$—$C(R6)_2$, $C(R6)_2$—$C(R6)_2$,

$CH_2$—$CH$—$CH_2$—R8, $C_6H_6$—$CH$—$CH_2$, $C_6H_6$—$C(CH_3)$—$CH_2$, molecule radical of monoepoxidized or polyepoxidized fats or oils as monoglycerides, diglycerides and triglycerides, molecule radical of monoepoxidized or polyepoxidized fatty acids or their $C_1$-$C_{24}$-alkyl esters, R5 is a $C_2$-$C_{24}$-alkyl radical, alkenyl radical, which may be linear or branched, R6 is a $C_1$-$C_{24}$-alkyl radical, alkenyl radical, which may be linear or branched, R7 is a $C_3$-$C_6$-alkyl radical which is arranged linearly, R8 is OH, Cl, $OCH_3$, $OCH_2$—$CH_3$, O—$CH_2$—CH=$CH_2$, O—CH=$CH_2$.

A person skilled in the art will know that branching points can be produced within the polymer chain by reaction of alkylene oxides which have a further group which is reactive in alkoxylation. Thus, when using glycidol as alkylene oxide, the OH group of the glycidol can produce a further polymer chain onto which alkylene oxide units can add. A similar situation applies when using polyepoxidized fat or oil derivatives.

Furthermore, $u_i$, $v_i$, $w_i$ are integers of 0-400; where at least one of the indices $u_i$, $v_i$ or $w_i$ is $\geq 4$;

$x_i$ is an integer from 1 to 100; with the additional proviso that —C(=O)—O—C(=O)—O— bonds (carbonate-carbonate bonds) do not occur within the polymer chains and —C(=O)—OH bonds do not occur at the end of individual polymer chains in the general formula (I) for polyether carbonate polyols;

n is an integer from 1 to 100, preferably from 1 to 8, particularly preferably from 1 to 4, in particular from 1 to 3;

i is an integer from 1 to n.

Furthermore, the following relationships preferably apply in the general formula (I)

$$\frac{1}{n} * \sum_{i=1}^{n} \frac{x_i}{u_i + v_i + w_i + x_i} = 0.02 \text{ to } 0.25$$

-continued $$\frac{1}{n} * \sum_{i=1}^{n} \frac{u_i}{u_i + v_i + w_i + x_i} = 0 \text{ to } 0.75$$

$$\frac{1}{n} * \sum_{i=1}^{n} \frac{v_i}{u_i + v_i + w_i + x_i} = 0 \text{ to } 0.98$$

$$\frac{1}{n} * \sum_{i=1}^{n} \frac{w_i}{u_i + v_i + w_i + x_i} = 0 \text{ to } 0.4$$

The monomer building blocks can be present in the individual polymer chains 1 to n in any order, provided that —C(=O)—O—C(=O)—O— bonds (carbonate-carbonate bonds) do not occur within the polymer chains and —C(=O)—OH bonds do not occur at the end of individual polymer chains. In addition, the n polymer chains of the polyether carbonate polyol can have independent compositions. Furthermore, it is possible for not all or only one of the n polymer chains to grow by means of alkoxylation during the addition reaction.

Due to the continuous introduction of $S_C$ and the initial charging of $S_R$, different structures of polyether carbonate polyols of the general formula (I) can be present side by side after the reaction. This applies particularly when $S_R$ is not prepared by alkoxylation of $S_C$ and additionally has a different functionality.

If u, v, w≠0 or u, v≠0 and at the same time w=0 in the general formula (I), the individual building blocks (R2—O), (R3—O) and (R4—O) or (R2—O) and (R3—O) can, independently of (C(=O)—O) units, be bound to one another either in the form of blocks, strictly alternately, randomly or in the form of gradients.

In a preferred embodiment of the invention, the polyether carbonate polyols of the general formula (I) have a block comprising an average of at least two, preferably an average of three, preferably an average of more than three, alkylene oxide units at the end of each of the n chains. In particular, the blocks at the end of the chains comprise propylene oxide units.

Preference is given to polyether carbonate polyols made up of starter substances, ethylene oxide, propylene oxide and carbon dioxide. These can be described by the general formula (II):

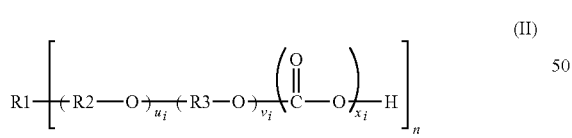

(II)

where R1, R2 and R3 have the same meanings as in formula (I).

Furthermore,
$u_i$, $v_i$ are integers of 0-400; where at least $u_i$ or $v_i$ is ≧4;
$x_i$ is an integer from 1 to 100; with the additional proviso that —C(=O)—O—C(=O)—O— bonds (carbonate-carbonate bonds) do not occur within the polymer chains and —C(=O)—OH bonds do not occur at the end of individual polymer chains in the general formula (II) for polyether carbonate polyols;
n is an integer from 1 to 100, preferably from 1 to 8, particularly preferably from 1 to 4, in particular from 1 to 3;
i is an integer from 1 to n.

Furthermore, the following relationships preferably apply in the general formula (II)

$$\frac{1}{n} * \sum_{i=1}^{n} \frac{x_i}{u_i + v_i + x_i} = 0.02 \text{ to } 0.25$$

$$\frac{1}{n} * \sum_{i=1}^{n} \frac{u_i}{u_i + v_i + x_i} = 0 \text{ to } 0.75$$

$$\frac{1}{n} * \sum_{i=1}^{n} \frac{v_i}{u_i + v_i + x_i} = 0.2 \text{ to } 0.98$$

The monomer building blocks can be present in the individual polymer chains 1 to n in any order, provided that —C(=O)—O—C(=O)—O— bonds (carbonate-carbonate bonds) do not occur within the polymer chains and —C(=O)—OH bonds do not occur at the end of individual polymer chains. In addition, the n polymer chains of the polyether carbonate polyol can have independent compositions. Furthermore, it is possible for not all or only one of the n polymer chains to grow by means of alkoxylation during the addition reaction.

Due to the continuous introduction of $S_C$ and the initial charging of $S_R$, different structures of polyether carbonate polyols of the general formula (II) can be present side by side after the reaction. This applies particularly when $S_R$ is not prepared by alkoxylation of $S_C$ and additionally has a different functionality.

If $u_i$, $v_i$≠0 in the general formula (II), the individual building blocks (R2—O) and (R3—O) can, independently of (C(=O)—O) units, be bound to one another either in the form of blocks, strictly alternately, randomly or in the form of gradients.

In a preferred embodiment of the invention, the polyether carbonate polyols of the general formula (II) have a block comprising an average of at least two, preferably an average of three, preferably an average of more than three, alkylene oxide units at the end of each of the n chains. In particular, the blocks at the end of the chains comprise propylene oxide units.

Particular preference is given to polyether carbonate polyols made up of starter substances, propylene oxide and carbon dioxide. These can be described by the general formula (III):

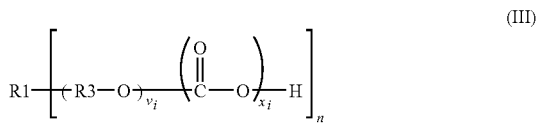

(III)

where R1 and R3 have the same meanings as in formula (I).
Furthermore,
$v_i$ is an integer of 4-400;
$x_i$ is an integer from 1 to 100; with the additional proviso that —C(=O)—O—C(=O)—O— bonds (carbonate-carbonate bonds) do not occur within the polymer chains and —C(=O)—OH bonds do not occur at the end of individual polymer chains in the general formula (III) for polyether carbonate polyols;
n is an integer from 1 to 100, preferably from 1 to 8, particularly preferably from 1 to 4, in particular from 1 to 3;
i is an integer from 1 to n.

Furthermore, the following relationships preferably apply in the general formula (III)

$$\frac{1}{n} * \sum_{i=1}^{n} \frac{x_i}{v_i + x_i} = 0.02 \text{ to } 0.25$$

$$\frac{1}{n} * \sum_{i=1}^{n} \frac{v_i}{v_i + x_i} = 0.75 \text{ to } 0.98$$

The monomer building blocks can be present in the individual polymer chains 1 to n in any order, provided that —C(=O)—O—C(=O)—O— bonds (carbonate-carbonate bond) do not occur within the polymer chains and —C(=O)—OH bonds do not occur at the end of individual polymer chains. In addition, the n polymer chains of the polyether carbonate polyol can have independent compositions. Furthermore, it is possible for not all or only one of the n polymer chains to grow by means of alkoxylation during the addition reaction.

Due to the continuous introduction of $S_C$ and the initial charging of $S_R$, different structures of polyether carbonate polyols of the general formula (III) can be present side by side after the reaction. This applies particularly when $S_R$ is not prepared by alkoxylation of $S_C$ and additionally has a different functionality.

The process of the invention surprisingly makes it possible to suppress the formation of by-products from the reaction of one or more alkylene oxides and carbon dioxide and thus to minimize losses of starting material. The process can be carried out simply and in customary reactors for preparing polyether polyols.

The polyether carbonate polyols of the invention have a low content of by-products and can be processed without problems, in particular by reaction with polyisocyanates to form polyurethanes, in particular flexible polyurethane foams. It can be seen that functionalities of the polyether carbonate polyols of at least 2 are necessary for polyurethane applications. Furthermore, polyether carbonate polyols can be used in applications known to those skilled in the art of polyols based on alkylene oxides, e.g. laundry detergent formulations and cleaner formulations, drilling liquids, fuel additives, ionic and nonionic surfactants, lubricants, process chemicals for paper or textile production or cosmetic formulations. A person skilled in the art will know that, depending on the field of application, polyether carbonate polyols to be used have to meet specified requirements in respect of molecular weights, viscosities, polydispersities and functionalities.

The invention is illustrated by the following examples.
ATR-FTIR (ATR=Attenuated Total Reflection) for On-Line IR Measurement:

during the reaction, the contents of free propylene oxide (828 cm$^{-1}$), the carbonate content of the polyether carbonate polyol (1745 cm$^{-1}$) and the carbonate content of the propylene carbonate (1814 cm$^{-1}$) are detected. The integrated areas of the absorptions at the indicated wave numbers serve to determine the mass contents of the corresponding species. A calibration of the ATR-FTIR probe based solely on propylene oxide was carried out beforehand. The carbonate content of the polyether carbonate polyol is therefore determined by means of $^{13}$C-NMR and the content of propylene carbonate is determined by means of GC.

Quantitative $^{13}$C-NMR Analysis:

quantitative $^{13}$C-NMR was employed for the precise determination of the carbonate contents of the polyether carbonate polyols. The carbonate signals in the range 150-160 ppm serve as basis for the evaluation. The evaluation gives the sum of the carbonate contents of polyether carbonate polyol and propylene carbonate of the isolated product.

The propylene carbonate contents were determined by means of an additional GC measurement. The carbonate content of the polyether carbonate polyols was determined by means of the difference between the $^{13}$C-NMR data and the GC data.

The carbonate contents of the polyether carbonate polyols determined by means of $^{13}$C-NMR and GC data are carbonate contents based on the total molecule. Carbonate contents based on the part of the molecule built up by means of the reaction were calculated with the aid of the hydroxyl numbers of the starter substances $S_R$ and $S_C$ and those of the isolated polyether carbonate polyols.

The functionality of starter substances or polyether carbonate polyols is abbreviated as F in the examples.

Viscosities reported are dynamic viscosities determined by means of a RheoLab viscometer at 25° C.

Water contents were determined by means of the Karl Fischer method.

Hydroxyl numbers were determined by means of titration.

The molecular weights $M_n$ and the polydispersities $P_D$ were determined by means of gel permeation chromatography (GPC) against a polystyrene standard using THF as eluent.

EXAMPLE 1

Preparation of a Polyether Carbonate Polyol Using Monopropylene Glycol as $S_C$ and Polypropylene Oxide ($M_n$~460 g/mol; Hydroxyl Number=242 mg KOH/g, F=2) as $S_R$; F=2 and Polypropylene Oxide End Block In a 20 l stirred reactor, 1950 g of a polypropylene oxide ($M_n$~460 g/mol; hydroxyl number=242 mg KOH/g, F=2) as $S_R$ and 52.5 g of a 5.25% strength DMC catalyst suspension in the same polypropylene oxide were dried at 130° C. under reduced pressure (10 mbar) for 1 hour. The water content was determined as 0.008% by weight.

The temperature of the reaction mixture was then reduced to 110° C. To activate the catalyst 200 g of propylene oxide were metered in at 0.5 kg/h. The activation of the catalyst was observed with the aid of the exothermic reaction. The metered addition of propylene oxide was continued at 0.5 kg/h. At the same time, the reactor pressure was increased to 3 bar by feeding in carbon dioxide. The amount of free propylene oxide in the liquid phase was observed by means of ATR-FTIR. This did not go above 4% by weight during the introduction of carbon dioxide and propylene oxide. After the reaction proceeded in a stable fashion, the metered addition of monopropylene glycol at 12 g/h was started and the amount of free propylene oxide was again observed (max. 5% by weight). After the reaction had stabilized, the reactor pressure was increased up to 8 bar (by 1 bar about every 20 minutes) by introduction of carbon dioxide. At the same time, the addition rate of the propylene oxide was increased stepwise to 3 kg/h (by 0.5 kg/h about every 40 minutes) and the addition rate of monopropylene glycol was increased stepwise to 72 g/h (by 12 g/h about every 40 minutes). The metered additions were regulated so that the metered additions of propylene oxide and of monopropylene glycol were stopped at a content of free propylene oxide in the reaction mixture of 8% by weight and only resumed when the content of free propylene oxide was less than 3% by weight, based on the weight of the reaction mixture. After introduction of 288 g of monopropylene glycol, this metered addition was stopped, and the metered additions of propylene oxide and carbon dioxide continued to an amount of 13.9 kg of propylene oxide. The metered additions of propylene oxide and carbon dioxide were subsequently stopped. As the monomers reacted, the pressure in the reactor dropped. After the content of free propylene oxide had decreased to less than 0.5% by weight, based on the weight of the reaction mixture, the reactor was depressurized and briefly evacuated. The metered addition of propylene oxide was then resumed at 1 kg/h and the remaining amount of 250 g was metered in. After the addition reaction of the propylene oxide, the metered addition was stopped and the reactor was depressurized. The total reaction time was about 7 hours. A sample of the crude product was taken for analysis. The product was subsequently stripped at 150° C. under reduced pressure for 3 hours, the product was drained and stabilized with 200 ppm of Irgastab® 1076. The total amount of carbon dioxide introduced was 2250 g. The molar ratio of $S_R$ to $S_C$ was 1.26.

Crude Product:
Mass: 18 370 g
Propylene carbonate by means of GC: 3.9%
Isolated Product:
Mass: 17 650 g
Propylene carbonate by means of GC: <200 ppm
Hydroxyl number: 51.6 mg KOH/g
Viscosity (25° C.): 1412 mPa*s
GPC: $M_n$=1781 g/mol; $P_D$=1.17
Carbonate Content of the Isolated Polyether Carbonate Polyol:
a) based on the total molecule: 8.8% by weight
b) based on the polymerized part without starter substances: 10.3% by weight

COMPARATIVE EXAMPLE 1 TO EXAMPLE 1

Preparation of a Polyether Carbonate Polyol Using Polypropylene Oxide ($M_n$~460 g/mol; Hydroxyl Number=242 mg KOH/g; F=2) as $S_R$; No Feed Stream of $S_C$; F=2 and Polypropylene Oxide End Block In a 20 l stirred reactor, 3755 g of a polypropylene oxide ($M_n$~460 g/mol; hydroxyl number=242 mg KOH/g, F=2) as $S_R$ and 48 g of a 5.25% strength DMC catalyst suspension in the same polypropylene oxide were dried at 130° C. under reduced pressure (10 mbar) for 1 hour. The water content was determined as 0.005% by weight.

The temperature of the reaction mixture was then reduced to 110° C. To activate the catalyst 200 g of propylene oxide were metered in at 0.5 kg/h. The activation of the catalyst was observed with the aid of the exothermic reaction. The metered addition of propylene oxide was continued at 0.5 kg/h. At the same time, the reactor pressure was increased to 3 bar by feeding in carbon dioxide. The amount of free propylene oxide in the liquid phase was observed by means of ATR-FTIR. This did not go above 5% by weight during the introduction of carbon dioxide and propylene oxide. After the reaction had stabilized, the reactor pressure was increased up to 8 bar (by 1 bar about every 20 minutes) by introduction of carbon dioxide. At the same time, the addition rate of the propylene oxide was increased stepwise to 3 kg/h (by 0.5 kg/h about every 40 minutes). The metered additions were regulated so that the metered additions of propylene oxide were stopped at a content of free propylene oxide in the reaction mixture of 8% by weight and only resumed when the content of free propylene oxide was less than 3% by weight, based on the weight of the reaction mixture. After introduction of 11.0 kg of propylene oxide, the metered additions of propylene oxide and carbon dioxide were stopped. As the monomers reacted, the pressure in the reactor dropped. After the content of free propylene oxide had decreased to less than 0.5% by weight, based on the weight of the reaction mixture, the reactor was depressurized and briefly evacuated. The metered addition of propylene oxide was then resumed at 1 kg/h and the remaining amount of 370 g was metered in. After the addition reaction of the propylene oxide, the metered addition was stopped and the reactor was depressurized. The total reaction time was about 7 hours. A sample of the crude product was taken for analysis. The product was subsequently stripped at 150° C. under reduced pressure for 3 hours, the product was drained and stabilized with 200 ppm of Irgastab® 1076. The total amount of carbon dioxide introduced was 1900 g.

Crude Product:
Mass: 16 700 g
Propylene carbonate by means of GC: 4.9%
Isolated Product:
Mass: 14 930 g
Propylene carbonate by means of GC: 350 ppm
Hydroxyl number: 57.9 mg KOH/g
Viscosity (25° C.): 1043 mPa*s
GPC: $M_n$=2022 g/mol; $P_D$=1.34
Carbonate Content of the Isolated Polyether Carbonate Polyol:
a) based on the total molecule: 7.8% by weight
b) based on the polymerized part without starter substances: 10.3% by weight

EXAMPLE 2

Preparation of a Polyether Carbonate Polyol Using a Mixture of Glycerol and Diethylene Glycol (Molar Ratio=3:1) as $S_C$ and a Polypropylene Oxide Based on Glycerol-Diethylene Glycol (Molar Ratio=3:1) ($M_n$~1130 g/mol; Hydroxyl Number=136 mg KOH/g; F=2.75) as $S_R$; F=2.75 and Polypropylene Oxide End Block In a 20 l stirred reactor, 1957 g of a polypropylene oxide based on glycerol-diethylene glycol (3:1) ($M_n$~1130 g/mol; hydroxyl number=136 mg KOH/g; F=2.75) as $S_R$ and 46 g of a 6.0% strength DMC catalyst suspension in the same polypropylene oxide were dried at 130° C. under reduced pressure (10 mbar) for 1 hour. The water content was determined as 0.009% by weight.

The temperature of the reaction mixture was then reduced to 110° C. To activate the catalyst 300 g of propylene oxide were metered in at 0.5 kg/h. The activation of the catalyst was observed with the aid of the exothermic reaction. The metered addition of propylene oxide was continued at 0.5 kg/h. At the same time, the reactor pressure was increased to 3 bar by feeding in carbon dioxide. The amount of free propylene oxide in the liquid phase was observed by means of ATR-FTIR. This did not go above 4% by weight during the introduction of carbon dioxide and propylene oxide. After the reaction proceeded in a stable fashion, the metered addition of the mixture of glycerol and diethylene glycol (molar ratio=3:1) at 15 g/h was started and the amount of free propylene oxide was again observed (max. 6% by weight). After the reaction had stabilized, the reactor pressure was increased up to 8 bar (by 1 bar about every 20 minutes) by introduction of carbon dioxide. At the same time, the addition rate of the propylene oxide was increased stepwise to 3.5 kg/h (by 0.5 kg/h about every 40 minutes) and the addition rate of glycerol/diethylene glycol mixture was increased stepwise to 105 g/h (by 15 g/h about every 40 minutes). The metered additions were regulated so that the metered additions of propylene oxide and of glycerol/diethylene glycol mixture were stopped at a content of free propylene oxide in the reaction mixture of 8% by weight and only resumed when the content of free propylene oxide was less than 3% by weight, based on the weight of the reaction mixture. After introduction of 380 g of glycerol/diethylene glycol mixture, this metered addition was stopped, and the metered additions of propylene oxide and carbon dioxide continued to an amount of 13.8 kg of propylene oxide. The metered additions of propylene oxide and carbon dioxide were subsequently stopped. As the monomers reacted, the pressure in the reactor dropped. After the content of free propylene oxide had decreased to less than 0.5% by weight, based on the weight of the reaction mixture, the reactor was depressurized and briefly evacuated. The metered addition of propylene oxide was then resumed at 2 kg/h and the remaining amount of 335 g was metered in. After the addition reaction of the propylene oxide, the metered addition was stopped and the reactor was depressurized. The total reaction time was about 7.5 hours. A sample of the crude product was taken for analysis. The product was subsequently stripped at 150° C. under reduced pressure for 3 hours, the product was drained and stabilized with 4500 ppm of Irgastab® PUR 68. The total amount of carbon dioxide introduced was 2100 g. The molar ratio of $S_R$ to $S_C$ was 0.44.

Crude Product:
Mass: 18 210 g
Propylene carbonate by means of GC: 3.9%
Isolated Product:
Mass: 17 400 g
Propylene carbonate by means of GC: <200 ppm
Hydroxyl number: 50.2 mg KOH/g
Viscosity (25° C.): 2120 mPa*s
GPC: $M_n$=1801 g/mol; $P_D$=1.51
Carbonate Content of the Isolated Polyether Carbonate Polyol:
a) based on the total molecule: 7.7% by weight
b) based on the polymerized part without starter substances: 9.2% by weight

COMPARATIVE EXAMPLE 2 TO EXAMPLE 2

Preparation of a Polyether Carbonate Polyol Using a Polypropylene Oxide Based on Glycerol-Diethylene Glycol (Molar Ratio=3:1) ($M_n$~1130 g/mol; Hydroxyl Number=136 mg KOH/g; F=2.75) as $S_R$; No Feed Stream of $S_C$; F=2.75 and Polypropylene Oxide End Block In a 20 l stirred reactor, 5960 g of a polypropylene oxide based on glycerol-diethylene glycol (molar ratio 3:1) ($M_n$~1130 g/mol; hydroxyl number=136 mg KOH/g; F=2.75) as $S_R$ and 43 g of a 6.0% strength DMC catalyst suspension in the same polypropylene oxide were dried at 130° C. under reduced pressure (10 mbar) for 1 hour. The water content was determined as 0.007% by weight.

The temperature of the reaction mixture was then reduced to 110° C. To activate the catalyst 300 g of propylene oxide were metered in at 0.5 kg/h. The activation of the catalyst was observed with the aid of the exothermic reaction. The metered addition of propylene oxide was continued at 0.5 kg/h. At the same time, the reactor pressure was increased to 3 bar by feeding in carbon dioxide. The amount of free propylene oxide in the liquid phase was observed by means of ATR-FTIR. This did not go above 5% by weight during the introduction of carbon dioxide and propylene oxide. After the reaction had stabilized, the reactor pressure was increased up to 8 bar (by 1 bar about every 20 minutes) by introduction of carbon dioxide. At the same time, the addition rate of the propylene oxide was increased stepwise to 4 kg/h (by 0.5 kg/h about every 40 minutes). The metered additions were regulated so that the metered additions of propylene oxide were stopped at a content of free propylene oxide in the reaction mixture of 8% by weight and only resumed when the content of free propylene oxide was less than 3% by weight, based on the weight of the reaction mixture. After introduction of 9.4 kg of propylene oxide, the metered additions of propylene oxide and carbon dioxide were stopped. As the monomers reacted, the pressure in the reactor dropped. After the content of free propylene oxide had decreased to less than 0.5% by weight, based on the weight of the reaction mixture, the reactor was depressurized and briefly evacuated. The metered addition of propylene oxide was then resumed at 1 kg/h and the remaining amount of 280 g was metered in. After the addition reaction of the propylene oxide, the metered addition was stopped and the reactor was depressurized. The total reaction time was about 6.5 hours. A sample of the crude product was taken for analysis. The product was subsequently stripped at 150° C. under reduced pressure for 3 hours, the product was drained and stabilized with 4500 ppm of Irgastab® PUR 68. The total amount of carbon dioxide introduced was 1750 g.

Crude Product:
Mass: 16 900 g
Propylene carbonate by means of GC: 4.3%
Isolated Product:
Mass: 15 400 g
Propylene carbonate by means of GC: 320 ppm
Hydroxyl number: 51.3 mg KOH/g
Viscosity (25° C.): 1481 mPa*s
GPC: $M_n$=1708 g/mol; $P_D$=1.58
Carbonate Content of the Isolated Polyether Carbonate Polyol:
a) based on the total molecule: 5.3% by weight
b) based on the polymerized part without starter substances: 12.3% by weight

EXAMPLE 3

Preparation of a Polyether Carbonate Polyol Using Castor Oil ($M_n$~950 g/mol; Hydroxyl Number=162 mg KOH/g; F~2.75) as $S_C$ and Castor Oil as $S_R$; Functionality~2.75 and Polypropylene Oxide End Block In a 20 l stirred reactor, 3936 g of castor oil ($M_n$~950 g/mol; hydroxyl number=162 mg KOH/g; F~2.75) as $S_R$ and 67.5 g of the DMC catalyst suspension from Example 2 were dried at 130° C. under reduced pressure (10 mbar) for 1 hour. The water content was determined as 0.012% by weight.

The temperature of the reaction mixture was then reduced to 110° C. To activate the catalyst 300 g of propylene oxide were metered in at 0.5 kg/h. The activation of the catalyst was observed with the aid of the exothermic reaction. The metered addition of propylene oxide was continued at 0.5 kg/h. At the same time, the reactor pressure was increased to 3 bar by feeding in carbon dioxide. The amount of free propylene oxide in the liquid phase was observed by means of ATR-FTIR. This did not go above 3.5% by weight during the introduction of carbon dioxide and propylene oxide. After the reaction proceeded in a stable fashion, the metered addition of castor oil ($S_C$) at 50 g/h was started and the amount of free propylene oxide was again observed (max. 5% by weight). After the reaction had stabilized, the reactor pressure was increased up to 8 bar (by 1 bar about every 20 minutes) by introduction of carbon dioxide. At the same time, the addition rate of the propylene oxide was increased stepwise to 3.0 kg/h (by 0.5 kg/h about every 40 minutes) and the addition rate of castor oil was increased stepwise to 300 g/h (by 50 g/h about every 40 minutes). The metered additions were regulated so that the metered additions of propylene oxide and of castor oil were stopped at a content of free propylene oxide in the reaction mixture of 8% by weight and only resumed when the content of free propylene oxide was less than 3% by weight, based on the weight of the reaction mixture. After introduction of 1000 g of castor oil, this metered addition was stopped, and the metered additions of propylene oxide and carbon dioxide continued to an amount of 9.5 kg of propylene oxide. The metered additions of propylene oxide and carbon dioxide were subsequently stopped. As the monomers reacted, the pressure in the reactor dropped. After the content of free propylene oxide had decreased to less than 0.5% by weight, based on the weight of the reaction mixture, the reactor was depressurized and briefly evacuated. The metered addition of propylene oxide was then resumed at 2 kg/h and the remaining amount of 356 g was metered in. After the addition reaction of the propylene oxide, the metered addition was stopped and the reactor was depressurized. The total reaction time was about 5.5 hours. A sample of the crude product was taken for analysis. The product was subsequently stripped at 150° C. under reduced pressure for 3 hours, the product was drained and stabilized with 4500 ppm of Irgastab® PUR 68. The total amount of carbon dioxide introduced was 2500 g. The molar ratio of $S_R$ to $S_C$ was 3.94.

Crude Product:
Mass: 16 050 g
Propylene carbonate by means of GC: 3.0%
Isolated Product:
Mass: 15 450 g
Propylene carbonate by means of GC: <200 ppm
Hydroxyl number: 51.3 mg KOH/g
Viscosity (25° C.): 2616 mPa*s
GPC: $M_n$=2122 g/mol; $P_D$=1.27
Carbonate Content of the Isolated Polyether Carbonate Polyol:
a) based on the total molecule: 9.4% by weight
b) based on the polymerized part without starter substances: 17.5% by weight COMPARATIVE EXAMPLE 3 to EXAMPLE 3

Preparation of a Polyether Carbonate Polyol Using Castor Oil ($M_n$~950 g/mol; Hydroxyl Number=162 mg KOH/g; F~2.75) as $S_R$; No Feed Stream of $S_C$; Functionality~2.75 and Polypropylene Oxide End Block In a 20 l stirred reactor, 4938 g of castor oil ($M_n$~950 g/mol; hydroxyl number=162 mg KOH/g; F~2.75) as $S_R$ and 67.5 g of the DMC catalyst suspension from Example 2 were dried at 130° C. under reduced pressure (10 mbar) for 1 hour. The water content was determined as 0.012% by weight.

The temperature of the reaction mixture was then reduced to 110° C. To activate the catalyst 300 g of propylene oxide were metered in at 0.5 kg/h. The activation of the catalyst was observed with the aid of the exothermic reaction. The metered addition of propylene oxide was continued at 0.5 kg/h. At the same time, the reactor pressure was increased to 3 bar by feeding in carbon dioxide. The amount of free propylene oxide in the liquid phase was observed by means of ATR-FTIR. This did not go above 4.0% by weight during the introduction of carbon dioxide and propylene oxide. After the reaction had stabilized, the reactor pressure was increased up to 8 bar (by 1 bar about every 20 minutes) by introduction of carbon dioxide. At the same time, the addition rate of the propylene oxide was increased stepwise to 3.0 kg/h (by 0.5 kg/h about every 40 minutes). The metered additions were regulated so that the metered additions of propylene oxide were stopped at a content of free propylene oxide in the reaction mixture of 8% by weight and only resumed when the content of free propylene oxide was less than 3% by weight, based on the weight of the reaction mixture. After introduction of 9.5 kg of propylene oxide, the metered additions of propylene oxide and carbon dioxide were stopped. As the monomers reacted, the pressure in the reactor dropped. After the content of free propylene oxide had decreased to less than 0.5% by weight, based on the weight of the reaction mixture, the reactor was depressurized and briefly evacuated. The metered addition of propylene oxide was then resumed at 2 kg/h and the remaining amount of 354 g was metered in. After the addition reaction of the propylene oxide, the metered addition was stopped and the reactor was depressurized. The total reaction time was about 5.5 hours. A sample of the crude product was taken for analysis. The product was subsequently stripped at 150° C. under reduced pressure for 3 hours, the product was drained and stabilized with 4500 ppm of Irgastab® PUR 68. The total amount of carbon dioxide introduced was 2400 g.

Crude Product:
Mass: 16 020 g
Propylene carbonate by means of GC: 3.5%
Isolated Product:
Mass: 15 300 g
Propylene carbonate by means of GC: <200 ppm
Hydroxyl number: 51.8 mg KOH/g
Viscosity (25° C.): 2472 mPa*s
GPC: $M_n$=2033 g/mol; $P_D$=1.30
Carbonate Content of the Isolated Polyether Carbonate Polyol:
a) based on the total molecule: 8.9% by weight
b) based on the polymerized part without starter substances: 16.8% by weight

The invention claimed is:

1. A process for preparing polyether carbonate polyols by addition of alkylene oxides and carbon dioxide onto H-functional starter substances using DMC catalysts, wherein one or more starter substances are initially placed in a reactor and one or more starter substances are metered continuously into the reactor during the reaction, the amount of one or more starter substances which are metered continuously into the reactor during the reaction being at least 20 mol % of the total amount of starter substances.

2. The process according to claim 1, wherein the starter substance initially placed in the reactor and the starter substance metered continuously into the reactor during the reaction are identical.

3. The process according to claim 1, wherein the starter substance initially placed in the reactor and the starter substance metered continuously into the reactor during the reaction are different.

4. The process according to claim 1, wherein the starter substance initially placed in the reactor is a reaction product of alkylene oxides with the starter substance metered continuously into the reactor during the reaction.

5. The process according to claim 1, wherein the amount of one or more starter substances which are metered continuously into the reactor during the reaction is at least 40 mol % of the total amount of starter substances.

6. The process according to claim 1, wherein the concentration of free alkylene oxides in the reaction mixture during the reaction is >0 40% by weight, based on the weight of the reaction mixture.

7. The process according to claim 1, wherein the concentration of free alkylene oxides in the reaction mixture during the reaction is >0 25% by weight, based on the weight of the reaction mixture.

8. The process according to claim 1, wherein the concentration of free alkylene oxides in the reaction mixture during the reaction is >0 15% by weight, based on the weight of the reaction mixture.

9. The process according to claim 1, wherein the concentration of free alkylene oxides in the reaction mixture during the reaction is >0 10% by weight, based on the weight of the reaction mixture.

10. The process according to claim 1, wherein the polyether carbonate polyols have a content of incorporated carbon dioxide in the form of carbonate units, based on the part of the molecule built up by the reaction without the starter substance, of 2 25% by weight.

11. The process according to claim 1, wherein the polyether carbonate polyols have a content of incorporated carbon dioxide in the form of carbonate units, based on the part of the molecule built up by the reaction without the starter substance, of 3 20% by weight.

12. The process according to claim 1, wherein the polyether carbonate polyols have a content of incorporated carbon dioxide in the form of carbonate units, based on the part of the molecule built up by the reaction without the starter substance, of 5 15% by weight.

13. The process according to claim 1, wherein the polyether carbonate polyols have a block comprising an average of at least two alkylene oxide units at the end of the polyether carbonate polyol chain.

14. The process according to claim 1, wherein the polyether carbonate polyols have a block comprising an average of at least three alkylene oxide units at the end of the polyether carbonate polyol chain.

15. A process for preparing a polyether carbonate polyol, comprising: reacting, in a reactor, at least one alkylene oxide and carbon dioxide with at least one H-functional starter substance in the presence of a DMC catalyst to thereby add the alkylene oxide and the carbon dioxide onto the H-functional starter substance to form a reaction mixture comprising the polyether carbonate polyol,
wherein prior to reacting the alkylene oxide and the carbon dioxide with the H-functional starter substance, at least a first portion of the H-functional starter substance is present in the reactor,
wherein a second portion of the H-functional starter substance is metered continuously into the reactor while the alkylene oxide and the carbon dioxide react with the H-functional starter substance, and
wherein the second portion of the H-functional starter substance is at least 20 mol % of the total amount of the H-functional starter substance.

16. The process according to claim 15, wherein the H-functional starter substance present in the reactor prior to the reacting is the same H-functional starter substance metered continuously into the reactor while the alkylene oxide and the carbon dioxide react with the H-functional starter substance.

17. The process according to claim 15, wherein the H-functional starter substance present in the reactor prior to the reacting is different from the H-functional starter substance metered continuously into the reactor while the alkylene oxide and the carbon dioxide react with the H-functional starter substance.

18. The process according to claim 15, wherein the second portion of the H-functional starter substance is at least 40 mol % of the total amount of the H-functional starter substance.

19. The process according to claim 15, wherein the concentration of unreacted alkylene oxide in the reactor during the reaction of the alkylene oxide and the carbon dioxide with the H-functional starter substance is from >0 to 40% by weight based on the total weight of the reaction mixture.

20. The process according to claim 15, wherein the concentration of unreacted alkylene oxide in the reactor during the reaction of the alkylene oxide and the carbon dioxide with the H-functional starter substance is from >0 to 25% by weight based on the total weight of the reaction mixture.

21. The process according to claim 15, wherein the concentration of unreacted alkylene oxide in the reactor during the reaction of the alkylene oxide and the carbon dioxide with the H-functional starter substance is from >0 to 15% by weight based on the total weight of the reaction mixture.

22. The process according to claim 15, wherein the concentration of unreacted alkylene oxide in the reactor during the reaction of the alkylene oxide and the carbon dioxide with the H-functional starter substance is from >0 to 10% by weight based on the total weight of the reaction mixture.

23. The process according to claim 15, wherein from 2 to 25% by weight of the weight of the polyether carbonate polyol formed by reacting the alkylene oxide and the carbon dioxide with the H-functional starter substance represents the alkylene oxide and the carbon dioxide reacted with the H-functional starter substance.

24. The process according to claim 15, wherein from 3 to 20% by weight of the weight of the polyether carbonate polyol formed by reacting the alkylene oxide and the carbon dioxide with the H-functional starter substance represents the alkylene oxide and the carbon dioxide reacted with the H-functional starter substance.

25. The process according to claim 15, wherein from 5 to 15% by weight of the weight of the polyether carbonate polyol formed by reacting the alkylene oxide and the carbon dioxide with the H-functional starter substance represents the alkylene oxide and the carbon dioxide reacted with the H-functional starter substance.

26. The process according to claim 15, wherein the polyether carbonate polyol has a block comprising an average of at least two alkylene oxide units at end of the polyether carbonate polyol chain.

27. The process according to claim 15, wherein the polyether carbonate polyol has a block comprising an average of at least three alkylene oxide units at the end of the polyether carbonate polyol chain.

* * * * *